(12) United States Patent
Ward et al.

(10) Patent No.: US 11,038,744 B2
(45) Date of Patent: *Jun. 15, 2021

(54) TRIGGERED IN-BAND OPERATIONS, ADMINISTRATION, AND MAINTENANCE IN A NETWORK ENVIRONMENT

(71) Applicant: Cisco Technology, Inc., San Jose, CA (US)

(72) Inventors: David D. Ward, Los Gatos, CA (US); Carlos M. Pignataro, Raleigh, NC (US); Frank Brockners, Cologne (DE); Shwetha Subray Bhandari, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,273

(22) Filed: Apr. 3, 2020

(65) Prior Publication Data
US 2020/0336360 A1 Oct. 22, 2020

Related U.S. Application Data

(63) Continuation of application No. 15/949,189, filed on Apr. 10, 2018, now Pat. No. 10,652,078, which is a
(Continued)

(51) Int. Cl.
*H04L 12/26* (2006.01)
*H04L 12/46* (2006.01)
(Continued)

(52) U.S. Cl.
CPC ...... *H04L 41/0631* (2013.01); *H04L 12/4633* (2013.01); *H04L 12/4641* (2013.01);
(Continued)

(58) Field of Classification Search
CPC ......... H04L 12/26; H04L 29/02; H04L 45/70; H04L 12/66; H04L 1/00; H04J 1/16
See application file for complete search history.

(56) References Cited

U.S. PATENT DOCUMENTS

| 7,990,888 | B2 | 8/2011 | Nadeau et al. |
| 8,976,680 | B2 | 3/2015 | Kompella |

(Continued)

FOREIGN PATENT DOCUMENTS

| CN | 104322043 A | 1/2015 |
| CN | 104702522 A | 6/2015 |

OTHER PUBLICATIONS

PCT International Search Report and Written Opinion from International Application Serial No. PCT/US2016/057250, dated Jan. 19, 2017; 13 pages.
(Continued)

*Primary Examiner* — Iqbal Zaidi

(57) ABSTRACT

Embodiments of the disclosure pertain to activating in-band OAM based on a triggering event. Aspects of the embodiments are directed to receiving a first notification indicating a problem in a network; triggering a data-collection feature on one or more nodes in the network for subsequent packets that traverse the one or more nodes; evaluating a subsequent packet that includes data augmented by the data collection feature; and determining the problem in the network based on the data augmented to the subsequent packet.

20 Claims, 5 Drawing Sheets

Related U.S. Application Data continuation of application No. 15/148,864, filed on May 6, 2016, now Pat. No. 9,992,056.

(60) Provisional application No. 62/244,095, filed on Oct. 20, 2015.

(51) Int. Cl.
*H04L 12/723* (2013.01)
*H04L 12/70* (2013.01)
*H04L 12/24* (2006.01)
*H04L 12/54* (2013.01)
*H04L 29/06* (2006.01)

(52) U.S. Cl.
CPC .............. *H04L 12/56* (2013.01); *H04L 41/04* (2013.01); *H04L 41/0677* (2013.01); *H04L 43/024* (2013.01); *H04L 43/04* (2013.01); *H04L 45/50* (2013.01); *H04L 69/22* (2013.01); *H04L 41/0686* (2013.01); *H04L 43/087* (2013.01); *H04L 43/0811* (2013.01); *H04L 43/0817* (2013.01); *H04L 43/0829* (2013.01); *H04L 43/0852* (2013.01); *H04L 43/0876* (2013.01); *H04L 43/10* (2013.01); *H04L 2012/5625* (2013.01)

(56) References Cited

U.S. PATENT DOCUMENTS

| | | | |
|---|---|---|---|
| 9,019,997 B1* | 4/2015 | Mok | H04B 10/07 370/503 |
| 2014/0362682 A1 | 12/2014 | Guichard et al. | |
| 2015/0023326 A1 | 1/2015 | Thubert et al. | |
| 2015/0092564 A1 | 4/2015 | Aldrin | |
| 2017/0111209 A1 | 4/2017 | Ward et al. | |

OTHER PUBLICATIONS

Aldrin, S., et al., "Service Function Chaining Operation, Administration and Maintenance Framework," Internet Engineering Task Force Internet Draft, draft-ietf-sfc-oam-framework-00, Aug. 17, 2015.

Brockners, Frank, "What if you had a trip-recorder for all your traffic at line rate performance?" Cisco Blog, Architect & DE Discussions, May 19, 2015; 7 pages; http://blogs.cisco.com/getyourbuildon/a-trip-recorder-for-all-your-traffic.

Office Action in corresponding Chinese Application 201680054358.X, dated Jul. 28, 2020, along with English Translation.

Official Communication in corresponding European Application No. 16785322.5-1213, dated Oct. 15, 2020, 11 pages.

* cited by examiner

TRIGGERED IN-BAND OPERATIONS, ADMINISTRATION, AND MAINTENANCE IN A NETWORK ENVIRONMENT

CROSS REFERENCE TO RELATED APPLICATION

This application is a continuation of U.S. patent application Ser. No. 15/949,189 filed Apr. 10, 2018, which in turn is a continuation of U.S. patent application Ser. No. 15/148,864, filed on May 6, 2016, now U.S. Pat. No. 9,992,056, which in turn claims priority to U.S. Provisional Application No. 62/244,095 filed Oct. 20, 2015, the entire contents of which are incorporated herein by reference.

TECHNICAL FIELD

This disclosure relates in general to the field of networking, and more particularly, to a triggered in-band operations, administration, and maintenance in a network environment.

BACKGROUND

As networks continue to dramatically grow and scale up, boundaries of how to perform operations, administration, and maintenance (OAM), telemetry, and service level agreement (SLA) validation and reporting at scale are tested and stretched. In computer networking, OAM includes processes, functions, activities, tools, etc. that are designed to monitor and administer network operation in order to detect network faults, isolate said faults, and to measure the performance of the network. In-band OAM can be used as an 'always on' service that adds forwarding path or service path information in addition to other information and/or statistics to network traffic. In-band OAM is a term that can also include passive OAM and/or in network telemetry (INT). The information can be very detailed information about the state or the forwarding behavior that every packet in the network experiences. If in-band OAM is enabled for every packet in a network with all features, an enormous amount of data could potentially be created.

In-band OAM can create a record or datagram for each customer packet that in-band OAM is applied to. That is, in some cases where all traffic would be using in-band OAM, there can be an OAM data record created for every packet.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Figure 1:
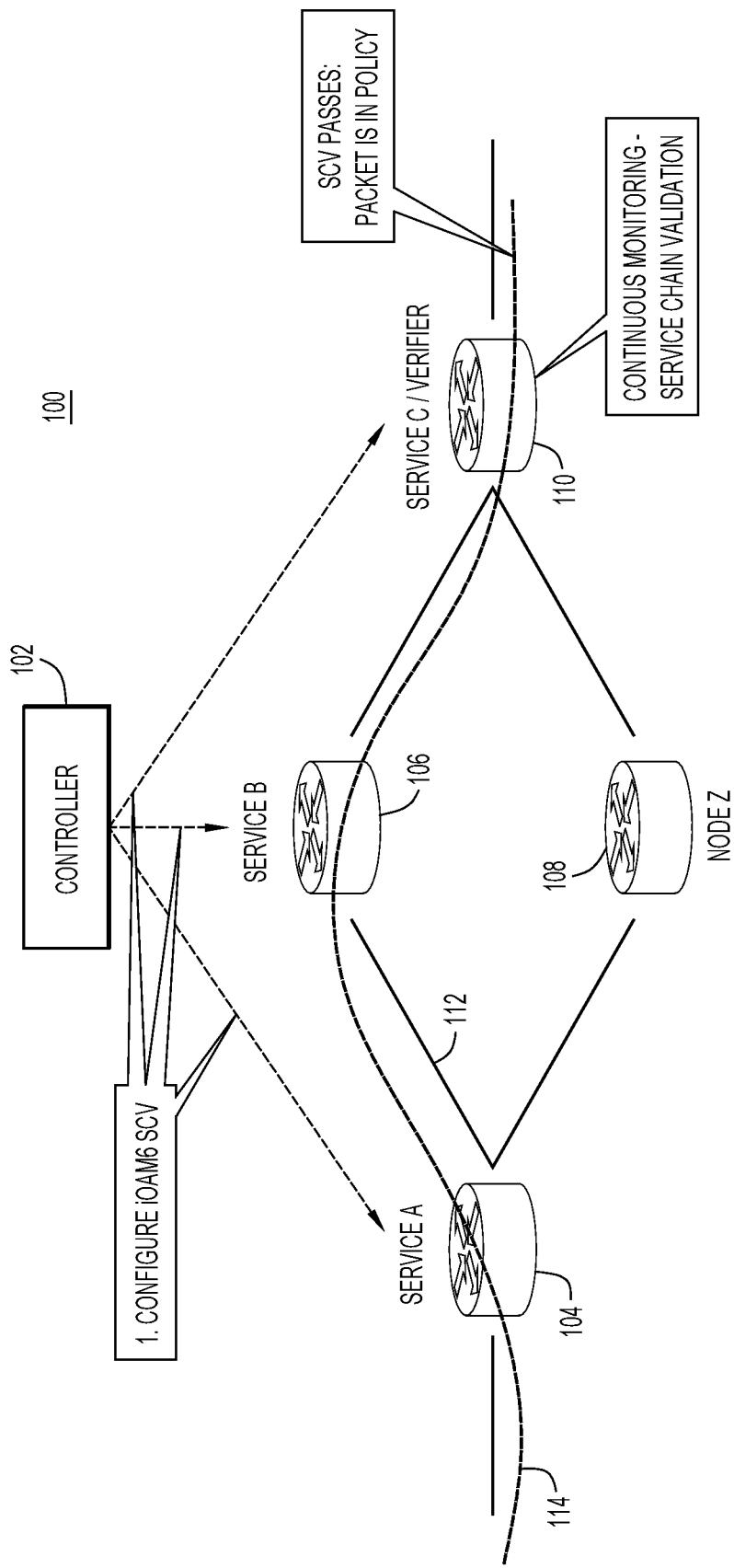
FIG. 1 is a simplified block diagram illustrating an example scenario in a communication system with triggered in-band operations, administration, and maintenance (OAM) in a network environment according to at least one embodiment of the present disclosure.

Aspects of the embodiments are directed to receiving a first notification indicating a problem in a network; triggering a data-collection feature on one or more nodes in the network for subsequent packets that traverse the one or more nodes; evaluating a subsequent packet that includes data augmented by the data collection feature; and determining the problem in the network based on the data augmented to the subsequent packet.

In some embodiments, the first notification indicates that a first packet has failed a service plane verification, and wherein the data-collection feature includes a packet tracing features applied to a second, subsequent packet, the data collection feature augmenting the second packet with data that includes source and destination information corresponding to source and destination information of the first packet.

Some embodiments may also include receiving a second notification indicating a second packet failed the service plane verification in the network, wherein the second notification includes packet trace information related to the second packet traversing at least one of the one or more nodes in the network.

In some embodiments, the packet trace information includes a failure condition that caused the second packet to fail the service plane verification.

Some embodiments may include identifying a cause for the first packet to fail the service plane verification, the identifying based on the failure condition included in the packet trace information associated with the second packet.

In some embodiments, the first notification is received from a node in the network or from a source external to the network.

In some embodiments, the node comprises a service node comprising an in-band operation, administration, and maintenance (OAM) node.

In some embodiments, triggering a data-collection feature on one or more nodes in the network for subsequent packets that traverse the one or more nodes comprises causing data to be augmented to a subset of subsequent packets, and wherein evaluating a subsequent packet that includes data augmented by the data collection feature comprises evaluating the subset of packets for data.

In some embodiments, the triggering a data-collection feature on one or more nodes in the network for subsequent packets that traverse the one or more nodes comprises triggering data-collection feature to augment packets carrying data traffic with metadata about the node or the network path.

In some embodiments, triggering a data-collection feature on one or more nodes in the network for subsequent packets that traverse the one or more nodes comprising triggering data collection feature on a subsequent packet that comprises probe data tagged with an in-band operation, administration, and maintenance (iOAM) tag.

In some embodiments, the iOAM tag is transported using one of an IPv6 or VxLAN-GPE header.

In some embodiments, the iOAM tag comprises one or more of delay related data, packet loss data, telemetry data, packet routing information, service function information, or bandwidth related data.

In some embodiments, the first notification indicates a packet loss at or above a threshold value, the packet loss at or above a threshold value triggering iOAM monitoring.

In some embodiments, the first notification indicates a jitter rate at or above a threshold value, the jitter rate at or above a threshold value triggering iOAM monitoring.

A network element comprising a hardware processor configured to receive a first notification indicating a problem in a network; and trigger a data-collection feature on one or more nodes in the network for subsequent packets that traverse the one or more nodes; evaluate a subsequent packet that includes data augmented by the data collection feature; and determine the problem in the network based on the data augmented to the subsequent packet.

In some embodiments, the first notification indicates that a first packet has failed a service chain verification, and wherein the data-collection feature includes a packet tracing features applied to a second, subsequent packet, the data collection feature augmenting the second packet with data that includes source and destination information corresponding to source and destination information of the first packet.

In some embodiments, the network element can be configured to receive a second notification indicating a second packet failed the service chain verification in the network, wherein the second notification includes packet trace information related to the second packet traversing at least one of the one or more nodes in the network.

In some embodiments, the packet trace information includes a failure condition that caused the second packet to fail the service chain verification.

In some embodiments, the network element can be configured to identify a cause for the first packet to fail the service chain verification, the identifying based on the failure condition included in the packet trace information associated with the second packet.

In some embodiments, the first notification is received from a service node in the network or from a source external to the network.

In some embodiments, the service node comprising an in-band operation, administration, and maintenance (OAM) node.

In some embodiments, triggering a data-collection feature on one or more nodes in the network for subsequent packets that traverse the one or more nodes comprises causing data to be augmented to a subset of subsequent packets, and wherein evaluating a subsequent packet that includes data augmented by the data collection feature comprises evaluating the subset of packets for data.

In some embodiments, the triggering a data-collection feature on one or more nodes in the network for subsequent packets that traverse the one or more nodes comprises triggering data-collection feature to augment packets carrying data traffic with metadata about the node or the network path.

In some embodiments, triggering a data-collection feature on one or more nodes in the network for subsequent packets that traverse the one or more nodes comprising triggering data collection feature on a subsequent packet that comprises probe data tagged with in-band operation, administration, and maintenance (iOAM).

Aspects of the embodiments are directed to a system comprising a network element configured to receive a packet from a network location and to transmit the packet to another network location, the network element configured to identify an error in a packet traversal of a network; and transmitting a notification about the error to a network controller or to an ingree node or to another node that can trigger iOAM monitoring. A network controller can be configured to receive the notification of the error from the network element; and instruct one or more network elements of the network to activate a data collection feature.

In some embodiments, the network controller is configured to configure in-band operation, administration, and maintenance (iOAM) path tracing for packets that will traverse the network.

In some embodiments, the network element comprises a service chain verifier (SCV) network element configured to inspect a packet that arrives at the network element; verify one or more policies for the packet; and notify the network controller of a failed policy.

In some embodiments, the network element is configured to augment a packet that carries data traffic with in-band operation, administration, and maintenance (iOAM) information pertaining to one or more packet-specific or network-specific policies.

In some embodiments, the network element is configured to receive a packet from a network location that includes in-band operation, administration, and maintenance (iOAM) information; determine a path tracing for the packet based on the iOAM information; and forward a notification to the network controller with path tracing information from the packet Aspects of the embodiments are directed to a non-transient computer readable medium having instructions operable when executed to receive a first notification indicating a problem in a network; triggering a data-collection feature on one or more nodes in the network for subsequent packets that traverse the one or more nodes; evaluate a subsequent packet that includes data augmented by the data collection feature; and determine the problem in the network based on the data augmented to the subsequent packet.

In some embodiments, the first notification indicates that a first packet has failed a service plane verification, and wherein the data-collection feature includes a packet tracing features applied to a second, subsequent packet, the data collection feature augmenting the second packet with data that includes source and destination information corresponding to source and destination information of the first packet.

Some embodiments may also include receiving a second notification indicating a second packet failed the service plane verification in the network, wherein the second notification includes packet trace information related to the second packet traversing at least one of the one or more nodes in the network.

In some embodiments, the packet trace information includes a failure condition that caused the second packet to fail the service plane verification.

Some embodiments may include identifying a cause for the first packet to fail the service plane verification, the identifying based on the failure condition included in the packet trace information associated with the second packet.

In some embodiments, the first notification is received from a node in the network or from a source external to the network.

In some embodiments, the node comprises a service node comprising an in-band operation, administration, and maintenance (OAM) node.

In some embodiments, triggering a data-collection feature on one or more nodes in the network for subsequent packets that traverse the one or more nodes comprises causing data to be augmented to a subset of subsequent packets, and wherein evaluating a subsequent packet that includes data augmented by the data collection feature comprises evaluating the subset of packets for data.

In some embodiments, the triggering a data-collection feature on one or more nodes in the network for subsequent packets that traverse the one or more nodes comprises triggering data-collection feature to augment packets carrying data traffic with metadata about the node or the network path.

In some embodiments, triggering a data-collection feature on one or more nodes in the network for subsequent packets that traverse the one or more nodes comprising triggering data collection feature on a subsequent packet that comprises probe data tagged with an in-band operation, administration, and maintenance (iOAM) tag.

In some embodiments, the iOAM tag is transported using one of an IPv6 or VxLAN-GPE header.

In some embodiments, the iOAM tag comprises one or more of delay related data, packet loss data, telemetry data, packet routing information, service function information, or bandwidth related data.

In some embodiments, the first notification indicates a packet loss at or above a threshold value, the packet loss at or above a threshold value triggering iOAM monitoring.

In some embodiments, the first notification indicates a jitter rate at or above a threshold value, the jitter rate at or above a threshold value triggering iOAM monitoring.

For purposes of illustrating certain example techniques of in-band operations, administration, and maintenance (OAM) systems disclosed herein, it is important to understand the communications that may be traversing the network and the protocols used in effecting such communications. The following foundational information may be viewed as a basis from which the present disclosure may be properly explained.

In-band OAM (iOAM) records how traffic is forwarded. To achieve this, information such as metadata or other associated data can be inserted directly into network traffic using, for example, extension headers available in Internet Protocol version 6 (IPv6), network service headers, Segment Routing, VxLAN-GPE, MPLS, etc. The information can be used for troubleshooting, planning, and path or service chain verification, and can be inserted into any network traffic, not just probe traffic. The information can be inserted at selected nodes and retrieved from an egress device. The information is broadly path and node or service data. Examples of the information could include, but are not limited to, ingress or egress interface identifier, time-stamp, node or service identifier, share of a secret describing a service or network element, sequence number, generic application metadata, CPU utilization, and/or interface statistics, such as drop percentage, utilization, etc.).

In one scenario, in-band OAM can be used for path or service chain verification. This verification can prove that certain traffic (e.g., traffic associated with an application identified by source and destination IP addresses, ports, and protocol used) traverses a particular service chain or path. In another example scenario, in-band OAM can be used for flow tracing through a network and detecting paths with issues. Application specific packets may also be traced. Application specific information can be included at every node into the packet.

If iOAM is 'always on' and enabled for every packet in a network with all features, the potential for generating an enormous amount of data is high. Rather than have all OAM data-generation 'always on' for all traffic, the efficiency of iOAM can be increased by turning on iOAM when needed, in which a maximum amount of usable network insight is provided with a minimum amount of overhead.

The overall amount of operational data created by iOAM for all traffic is one concern. Another concern can include that the use of iOAM can incur a cost on the forwarding element. For example, heavy or "always on" use of iOAM can lead to higher CPU load of the forwarding element (processing and insertion of data is not free, especially not on software-based forwarders) or decreased performance. Also, not all in-band OAM features are of the same quality, e.g., service/path verification requires read-compute-write operations on every packet and hence has a different impact to traffic than e.g. embedding the node-id only.

Similarly, the addition of timestamp data (depending on the efficiency of the clock lookup) can be more expensive than adding data such as ingress or egress link, all of which leads to a situation where one does not want all iOAM features on at all times. Another "issue" to consider is the size of the meta-data gathered. The larger the amount of meta-data added, the more overhead required. This means that the effective path-MTU for an application might be less if iOAM is used within the network.

Triggered OAM can be used in several instances. Generally, these uses are out-of-band traditional OAM, which signals a failure. Some examples include Access Node Control Protocol (ANCP) OAM, which is used to trigger the generation of asynchronous transfer mode (ATM) (F4/F5) loopback cells on the local loop. Also, multi-protocol label switching (AWLS) OAM or network virtualization overlays (NVO3) OAM can be used as a protection trigger. In another example, Y.1731/Ethernet connectivity fault management (CFM) (802.1ag) OAM deployments can also leverage triggered OAM.

Examples of Y.1731 include alarms like alarm indication signal (AIS) and remote defect indication (RDI) alarms. These are triggered alarm indications that use out-of-band OAM, and not triggered in-band OAM. Further, these alarm elements operate at the transport level, rather than operating on the service plane.

Embodiments described herein can resolve the aforementioned issues (other issues) associated with in-band OAM. Embodiments disclosed herein provide a communication system with triggered in-band OAM capabilities, which can create detailed information dynamically, as needed. The communication system can comprise a plurality of nodes, which can be traversed by packets being communicated in a network environment. The communication system can also include a controller in communication with the plurality of nodes. Detailed information created in a communication system with triggered in-band OAM capabilities can be generated under conditions that indicate a failure or that hint at a potential issue. Embodiments disclosed herein for triggered in-band OAM for Internet Protocol (IP) and overlay technologies (VxLan-GPE, NSEI, MPLS, etc.) operate on service paths of a network and enable users to focus analysis on actual network behavior. A first embodiment of a communication system provides selective multi-level in-band OAM triggered on external events or in-band OAM itself. A second embodiment of a communication system provides in-band probing, which can be a single stage, in-band trigger. A third embodiment of a communication system provides in-band OAM sampling.

Several advantages are provided by embodiments disclosed herein. First, embodiments disclosed herein offer increased scalability and optimization for network address translation. Embodiments disclosed herein can reduce the data volume generated by in-band OAM and focus the data created on information that is of interest to a user, such as a network operator or administrator. Embodiments disclosed herein also enable scaling both in the data plane as well as in the post-processing analytics. In addition, embodiments are truly in-band with real data rather than using Internet control message protocol (ICMP), which sends error messages, or F4/F5 alarms. For example, triggered in-band OAM can be used for performance metrics, in a triggered fashion, and not only for alarm signaling. Furthermore, embodiments are related to service-path level triggered OAM, which effectively creates triggered services telemetry. In addition, embodiments disclosed herein offer flexibility and can improve the signal-to-noise ratio on instrumentation and telemetry.

A first embodiment provides a communication system with multi-level triggered OAM in which one or more data collection capabilities of in-band OAM are enabled based on a trigger. The data source for the trigger could be either the in-band OAM itself or another external event. In an example scenario, a network anomaly can be detected by a network node. Following the detection of the anomaly, a specific set of in-band OAM features can be enabled for a particular set of flows to provide further insights. In some embodiments, the network node that detects the anomaly can either send a trigger to a set of ingress nodes directly, or can report the anomaly to a controller, which then decides which iOAM features should be enabled on which network nodes. The association between the event and the specific iOAM data collection to be triggered can be driven by semantic reasoners that are driven by the network model known to the triggering application.

In some embodiments, the trigger can be communicated in different ways. For example, the node detecting an anomaly can send the trigger forward within a communications path, such as a service path, to be interpreted within a specific context (i.e., the context of the service chain, the node detecting the anomaly, the content of the data packet, etc.). The node can also send a trigger to a predefined rendezvous point, proxy point, etc. In any case, the receiver of the trigger can cause the activation of iOAM data collection.

An example scenario of a communication system with multi-level triggered in-band OAM is now provided. Users (e.g., network operators or administrators, etc.) can use in-band OAM to verify correct functioning of a service chain of services A, B, and C. For example, iOAM for IPv6 carries proof-of-transit data in the data packets. A service node, such as service node C, can act as a verifier. If service node C detects an out of policy packet, a user might want to know why the packet failed path/service verification. For example, the packet may have missed a particular service and/or node. The proof-of-transit data in iOAM can indicate that the service chain was not traversed correctly, but does not identify where failure occurred.

Multi-level triggered in-band OAM can enable identification of where failure occurs in the system. First, a verifying service node, such as service node C, detects a failure for a particular packet X, and reports the failure to a controller. The controller triggers (e.g., enables, facilitates, starts, initiates, etc.) in-band OAM flow tracing, for all packets on the service chain which have the same source and destination as packet X. In at least some embodiments, triggers could either be carried as a Netconf notification or could also be Netflow/WFIX records, Kafka message broker client, Google protocol buffers, etc. When in-band OAM flow tracing is triggered, service node C reports detailed path information for every packet that has the same source and destination as packet X. This is referred to as 'multi-level' where the selected needs (e.g., of the user) are followed and different in-band OAM features are enabled or disabled.

On the next failed verification, the controller receives not only a notification that a packet failed service chain verification, but also receives detailed flow tracing information. For example, assume that the trace shows that packet X visited service nodes A, Z, and C but not service node B. With this information, the user can now focus on debugging service node B specifically.

As an example of multi-level iOAM can include:
Level 0: initially, no iOAM involvement; could include cases where network problems are detected, but not to a level that might benefit from iOAM monitoring;
Level 1: active OAM (e.g., a ping) failure triggers iOAM with coarse sampling and sequence numbers.
Level 2: semantic reasoner does not detect anomalies on sequence numbers even though semantic reasoner should: can trigger fine grain sampling of sequence numbers. Loss/reordering can be detected.
Level 3: trigger detailed tracing (node & timestamp recording) for packets that seem to experience occasional losses—to identify the node that is the source of the problem.
Each level can be activated automatically.

Figure 2:
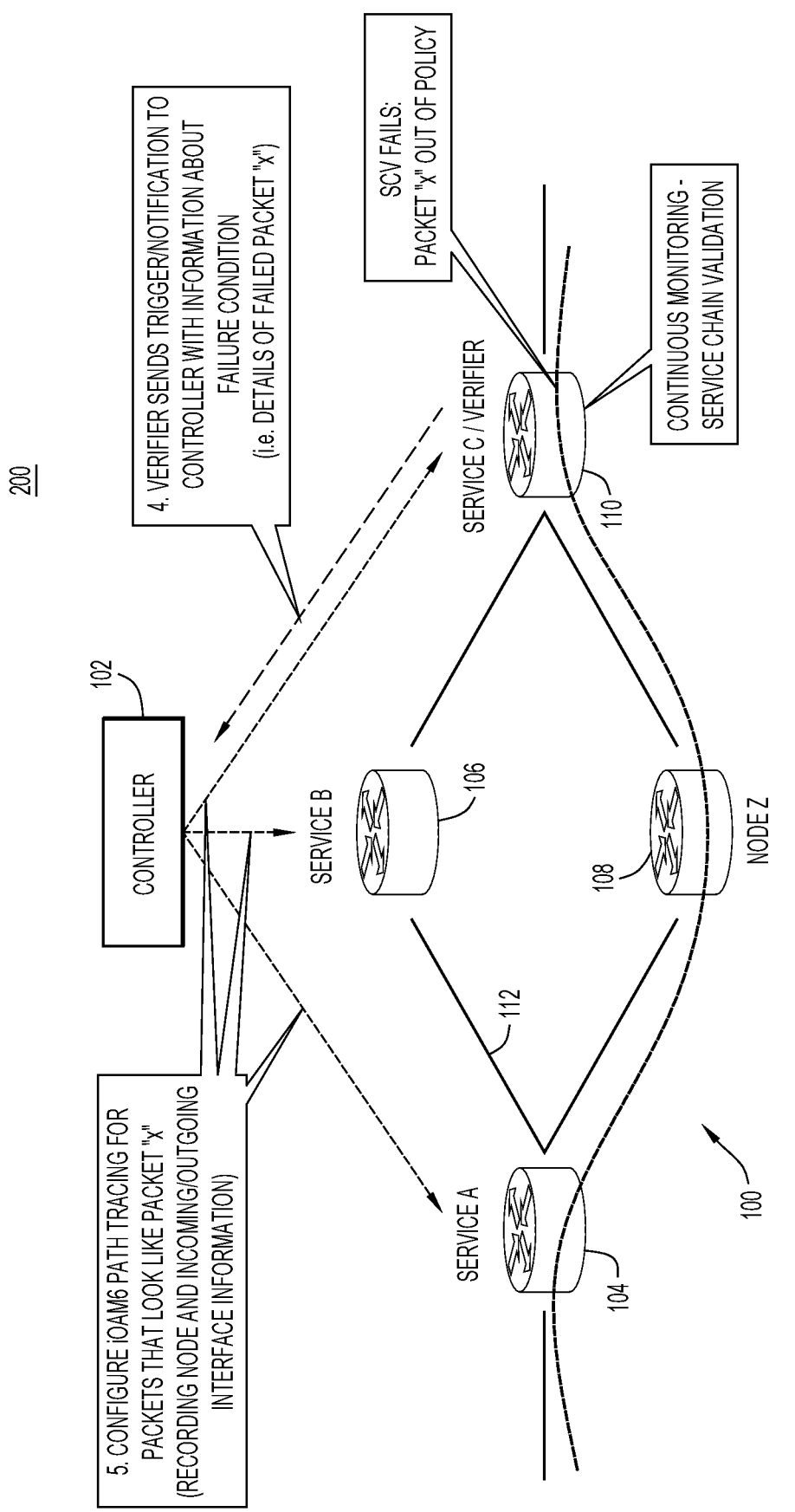
FIG. 2 is a simplified block diagram illustrating another example scenario in the communication system with triggered in-band OAM according to at least one embodiment of the present disclosure.
Figure 3:
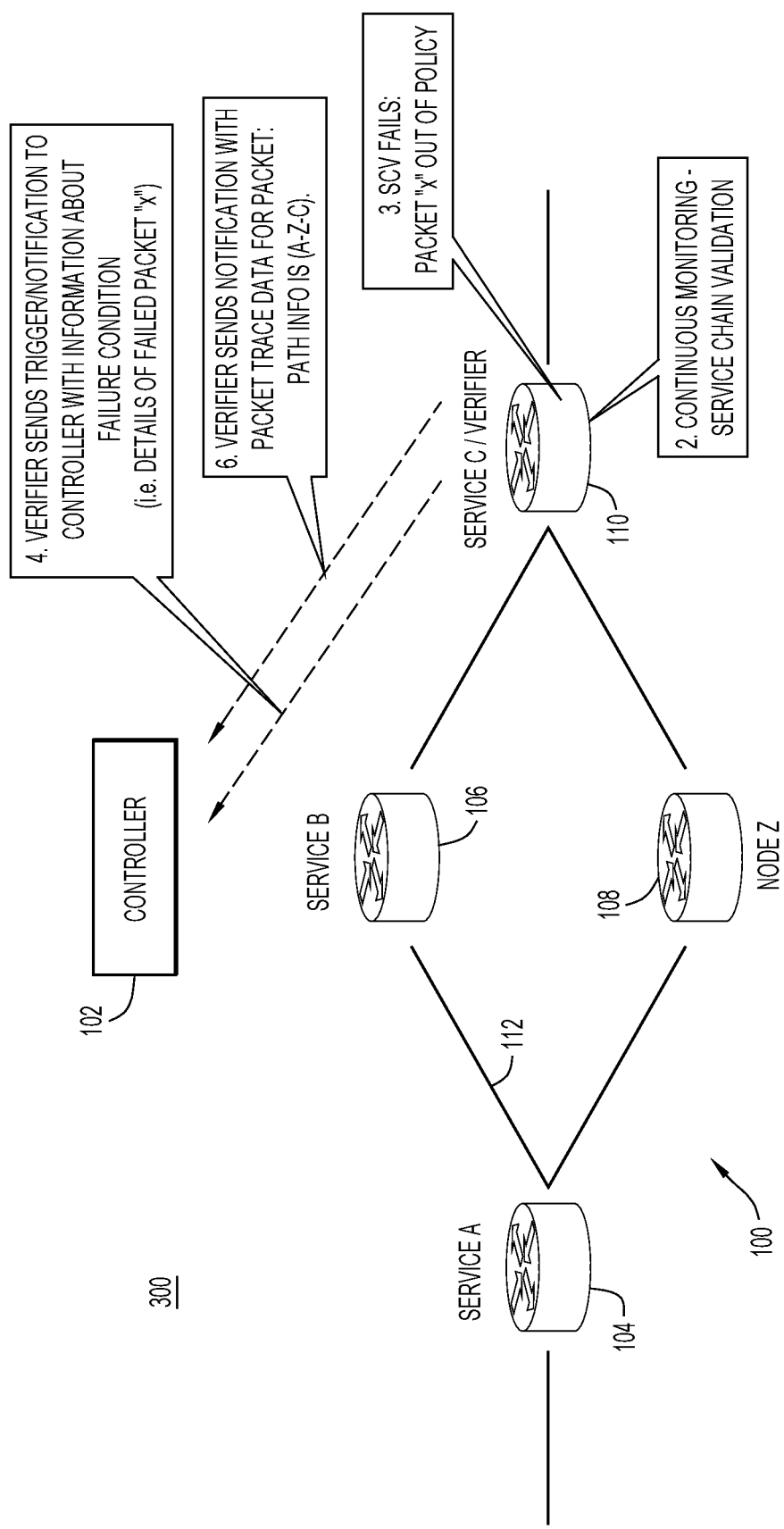
FIG. 3 is a simplified block diagram illustrating yet another example scenario in the communication system with triggered in-band OAM according to at least one embodiment of the present disclosure.

FIGS. 1-3 illustrate an example communication system with in-band OAM in a network environment according to at least one embodiment. FIG. 1 illustrates a normal operation of an in-band OAM in a network 100. A controller 102 configures service chain/path verification (SCV) on service nodes A 104, B 106, and C 110. Service node C 110 can act as a verifier. As packets traverse the service chain 114, service node C 110 provides continuous monitoring and checks whether the packets have traversed the service chain correctly. Network 100 also includes Node z 108. Each node (or network element) can be coupled via a communication pathway, such as communication pathway 112.

FIG. 2 illustrates an example scenario of an anomaly/exception occurring in the communication system 200 and the use of multi-level triggered in-band OAM to identify pertinent information regarding the anomaly/exception. In FIG. 2, packet X does not pass service chain verification (i.e., the packet X fails verification). The verifier (e.g., service node C 110 in this example) sends a trigger/notification (e.g., Netconf notification) to the controller 102 with information about the failure (i.e., details about failed packet X). Receiving the notification may cause the controller to configure additional in-band OAM features. In the example of FIG. 2, the additional in-band OAM feature to be configured is path tracing for packets that look like packet X. In one example, the path tracing can include recording node and incoming/outgoing interface information for packets that have, for example, the same source and destination information (e.g., network addresses, ports, protocol) as packet X.

FIG. 3 illustrates an example scenario 300 of the anomaly/exception occurring again after the additional in-band OAM feature is configured in the communication system. In the example of FIG. 3, after the occurrence of the anomaly/exception and the dynamic configuration of additional in-band OAM features, detailed information can be generated for subsequent packets that have the same source and destination as packet X. In one example, this detailed information can be generated due to the dynamic configuration of path tracing in one or more nodes of the communication system 100. As shown in FIG. 3, a packet 'X+1' traverses communication system via service node A 104, node Z 106, and service node C 110, and bypasses service node B 106. Packet X+1 arrives at service node C 110 and fails service chain verification. However, due to the configuration of path tracing, packet X+1 includes iOAM6 path tracing information. The controller (and thus the user) can glean an understanding that SCV failure is likely due to the packet bypassing service node B 106.

In another example of triggered in-band OAM, a user observes jitter while accessing a real-time network application. The user can log in to the observation via a portal. This may be converted to an event that is evaluated to trigger in-band OAM for the specific user and application. The event evaluation can lead to triggering in-band OAM features to collect timestamps and path packet counters to identify the cause of the problem. The data collected can give the details of points in the network that are causing the delay, packet reordering and/or packet drops.

Based on network conditions, certain in-band OAM capabilities are enabled or disabled. This allows the operational data that is gathered to be focused on particular data that is desired or needed based on particular implementations, preferences, and/or needs. Data without any use can be avoided by not being generated or gathered. This can benefit performance during data-creation as well as data post processing. This also facilitates the use of applications that can take immediate corrective action due to the higher level of programmatic network debugging.

A second embodiment provides a communication system with in-band triggered probing. The overall amount of OAM information that is created can be reduced by relying on probe data tagged with in-band OAM. This is a single-stage triggered in-band OAM.

To debug or analyze certain network scenarios, a user may desire to send specific probe data into the network. Such data can be distinguished from ping or trace data, at least in part because probe data can be similar to normal application data. This can ensure that the network treats and forwards the probe data in the same way as regular traffic.

In at least one embodiment, in-band GAM could be configured so that in-band OAM information is added only to the probe data. Specific probe data can currently be used to qualify the health of a network. Additional information provided by in-band triggered probing could be beneficial to help identification of particular failures and the causes thereof.

In at least one embodiment, instead of using probe packets that are similar to network data, actual network packets may be used. For example, we can configure a classifier at ingress (whichever the granularity) to focus on specific flows (e.g., platinum service, risky additional security checks needed flows, etc.), and tag those packets at ingress within the iOAM header. A node downstream can then act on it in a triggered iOAM fashion based on metadata (a tag) carried in the packet. Another example of an in-band trigger for in-band OAM is a specific traffic pattern or a flag set at the classifier.

A third embodiment provides a communication system with sampled OAM using ordinal and/or temporal triggers. Sampling in-band OAM data can reduce the amount of data presented to analysis systems. Scalability can be increased using sampling to reduce the amount of data. In at least one embodiment, either (1) only every nth packet includes added in-band OAM information, or (2) only information from every nth packet is analyzed at an egress node. Further, sampling every nth packet can be source controlled via packet coloring (e.g., using an access control list (ACL)), or network element controlled based on local resource thresholds (e.g., buffers, bandwidth, etc.).

Additional examples of the sampling rate and algorithm can be adapted based on triggered information. For example, if packet loss in the network is observed, iOAM can be turned on to add sequence numbers to packets to detect the amount of packet loss. If sampling is too coarse, the sampling might not properly show the packet loss issue (e.g., if every 10th packet is lost, but sampling is only looking at every 1000th packet, the loss might not be detected. iOAM can be triggered to scale sampling to better detect packet loss.

In at least one embodiment, 'n' can be a function rather than a fixed value. For example, the sampling rate could be a function of the flow length: the longer a flow lasts, the fewer packets are tagged with in-band OAM information. In other implementations, the sampling rate could be a function of a temporal trigger. The adjustment of the sampling rate can be based on triggers (e.g., flow length thresholds).

The several embodiments described herein (e.g., multi-level in-band OAM triggered on external events, in-band probing, in-band sampling) provide the creation of operational metadata in a triggered fashion. A truly in-band OAM is triggered such that the signal-to-noise ratio is raised for service events. The in-band OAM operates at the service path and can be enabled based on some condition or alarm. An alarm could be in-band (e.g., signal/flag, specific traffic pattern) in at least one embodiment. A data-source for the trigger could either be in-band OAM itself or another external event. Furthermore, packet coloring can be an action that controls sampling. Finally, any suitable combination of the several embodiments described herein could be provided to create detailed information dynamically, for example, when conditions indicate a failure in the network or hint at potential issue.

Figure 4:
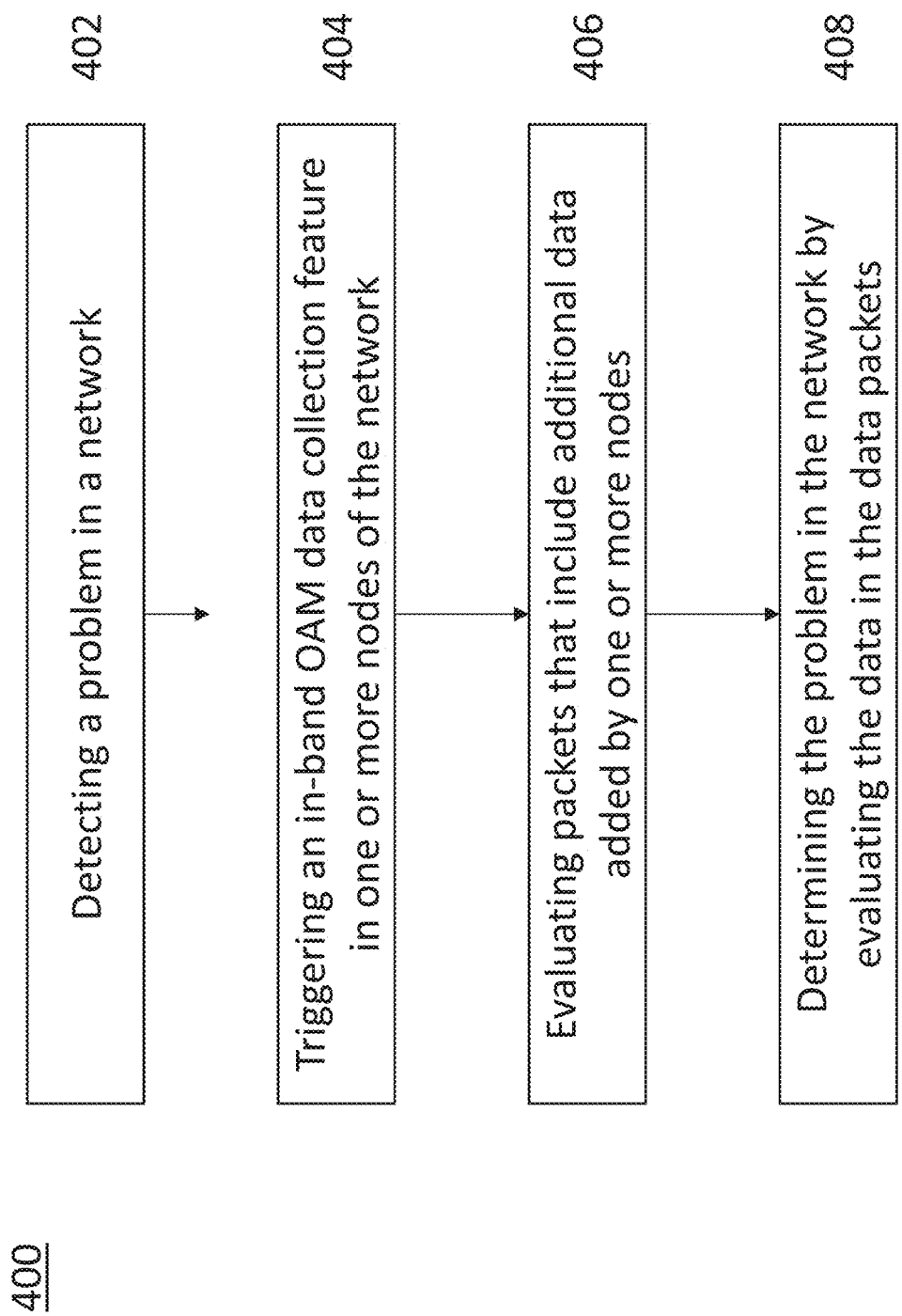
FIG. 4 is a process flow diagram for triggering in-band operation, administration, and maintenance in a network environment in accordance with embodiments of the present disclosure.

FIG. 4 is a process flow diagram 400 for triggering in-band operation, administration, and maintenance in a network environment in accordance with embodiments of the present disclosure. A controller can configure in-band OAM service chain verification on one or more service nodes in a network. Packets traverse the service chain. In some embodiments, a node can serve as a service chain verifier (SCV) verifier checks whether packets have traversed the service chain correctly.

A network element, such as an SCV, can determine a problem in the network (402). For example, the network element can determine that a service function was not applied to a packet, a packet fails service chain verification or validation, a network anomaly, or other problem. The data-source for the trigger could either be in-band OAM itself or another, external event.

The network element can trigger in-band OAM data collection feature in other nodes of the network (404). Following the detection of the anomaly, a specific set of in-band OAM features will be enabled for a particular set of flows to provide further insights. Typically the node which detects the anomaly would either send a trigger to a set of ingress nodes directly, or just report the anomaly to a controller, which then decides which iOAM features should be enabled on which network nodes. The association between the event and the specific iOAM data collection to be triggered can be driven by semantic reasoners that are driven by the network model known to the triggering application.

The network element can receive another packet from the network location. The network element can determine whether the packet still reflects the network anomaly detected previously (406). The packet can include additional information (e.g., iOAM information) pertaining to the nodes the packet traversed, as well as other network information.

The network element can determine the network problem or anomaly based on the iOAM information from the second packet (408). In one example, if the second packet fails verification, upon the next failed verification, the network element can provide a notification to a controller that a packet failed service chain verification, and also receives detailed flow tracing information. In the path verification scenario, assuming the trace shows that the packet only visited nodes A and C but not B, the network element can identify a problem at node B. The network element can report the problem to an operator, who can now focus on debugging node B specifically.

Figure 5:
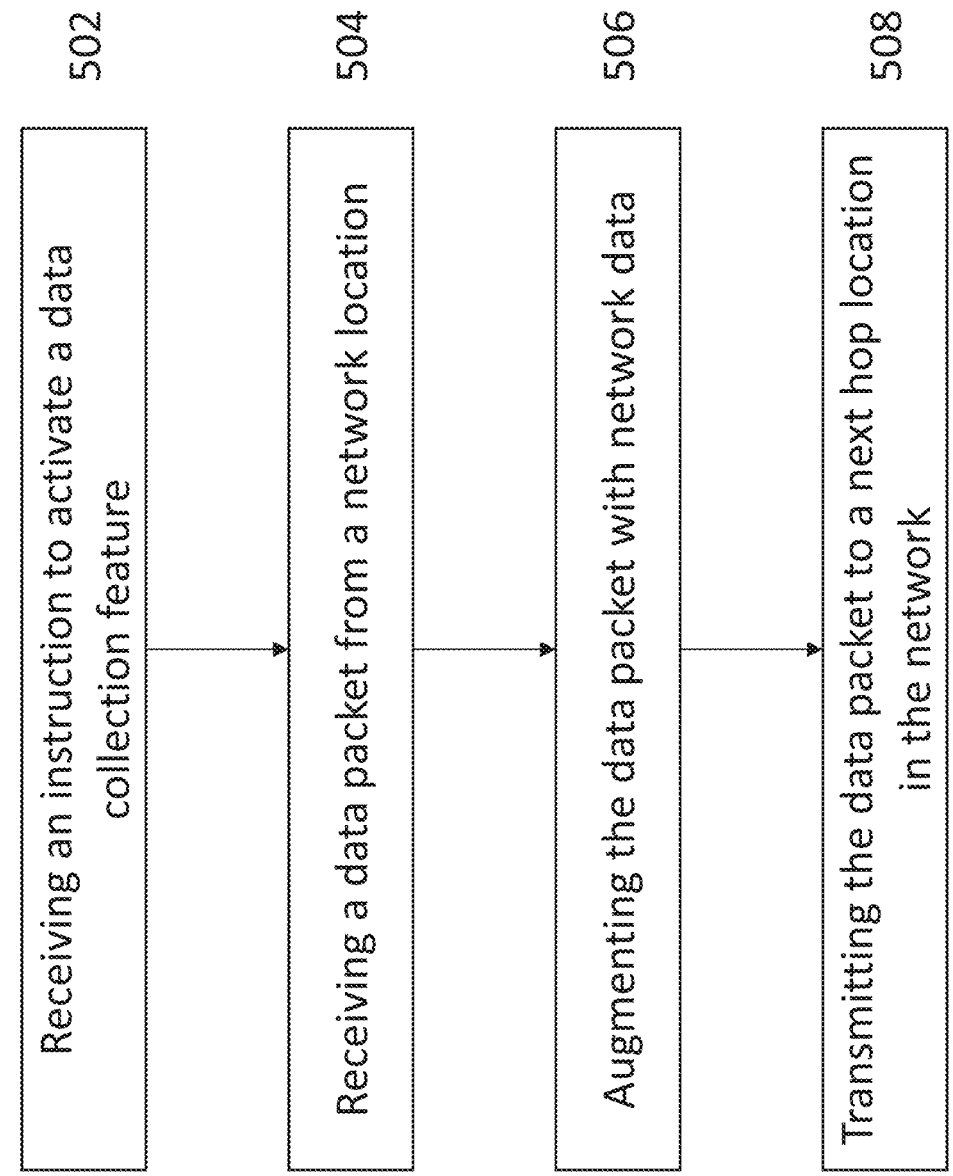
FIG. 5 is a process flow diagram for augmenting a packet with in-band operation, administration, and maintenance (iOAM) information in accordance with embodiments of the present disclosure.

FIG. 5 is a process flow diagram 500 for augmenting a packet with in-band operation, administration, and maintenance (iOAM) information in accordance with embodiments of the present disclosure. A network element, such as a network node, can receive an instruction to activate a data collection feature (e.g., an iOAM data collection feature) 502. The network element can receive a data packet from a network location (504). The network element can augment the data packet with iOAM information, such as information about the node, the network, a service function, a policy, or other network information (506). The network element can then transmit the data packet to a next hop location in the network (508).

Variations and Implementations

Within the context of the disclosure, a network referred to herein represents a series of points, nodes, or network elements of interconnected communication paths for receiving and transmitting packets of information that propagate through a network address translation system. A network offers communicative interfaces between sources, destinations, and intermediate nodes, and may be any local area network (LAN), wireless local area network (WLAN), virtual private network (VPN), or any other appropriate architecture or system that facilitates communications in a network environment depending on the network topology. A network can comprise any number of hardware and/or software elements coupled to (and in communication with) each other through a communication medium.

Communications in a network environment are referred to herein as 'network traffic' or 'traffic', which may be inclusive of packets. A packet is a formatted unit of data, and can contain both control information (e.g., source and destination addresses, etc.) and data, which is also known as payload. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise packets.

Nodes, service nodes, and a controller of a communication system described herein can be network elements in network environment. As used herein, the term 'network element' is meant to encompass routers, switches, gateways, bridges, load balancers, service appliances, firewalls, servers, processors, modules (any of which may be physical or virtually implemented on physical hardware) or any other suitable device, component, element, proprietary appliance, or object that is operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In at least one example implementation, network elements with triggered in-band OAM capabilities described herein include logic to achieve (or to foster) the activities as outlined herein. Note that in at least one example, each of these elements can have an internal structure (e.g., processors, memory elements, network interface cards, etc.) to facilitate some of the operations described herein. In some embodiments, these activities may be executed externally to these elements, or included in some other network element to achieve this intended functionality. In at least one embodiment these network elements may include logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In certain example implementations, the triggered in-band OAM capabilities outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these network elements can include memory for storing information to be used in achieving the triggered in-band OAM capabilities, as outlined herein. Additionally, these network elements may include at least one processor that can execute software, an algorithm, or other instructions to perform the triggered in-band OAM operations, as disclosed herein. These network elements may further keep information, to be used in achieving the triggered in-band OAM capabilities as discussed herein, in any suitable memory element (ternary content addressable memory (TCAM), random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components, as well as more complicated/sophisticated arrangements and configurations. Accordingly, the examples provided should not limit the scope or inhibit the broad teachings of the various embodiments of triggered in-band OAM as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

It is also important to note that the activities, interactions, and operations shown and described herein illustrate only some of the possible interoperability scenarios and patterns that may be executed by, or within, the nodes with triggered in-band OAM capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by network elements with triggered in-band OAM capabilities in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of triggered in-band OAM as disclosed herein.

What is claimed is:

1. A method comprising:
receiving a first notification indicating a failure of a transmission of a first packet in a network;
in response to receiving the first notification, triggering a data collection feature on one or more nodes in the network for one or more subsequent packets that traverse the one or more nodes, wherein the one or more subsequent packets are augmented to carry metadata about the one or more nodes or network paths traversed by the one or more subsequent packets, wherein triggering the data collection feature comprises triggering the data collection feature on the one or more subsequent packets that comprises probe data included in an in-band operation, administration, and maintenance (iOAM) tag carried in a header of the one or more subsequent packets;
evaluating a particular subsequent packet of the one or more subsequent packets, wherein the particular subsequent packet is transmitted in the network after the first notification is received; and
determining a cause for the failure of the transmission of the first packet in the network based on data augmented to the particular subsequent packet.

2. The method of claim 1, wherein the first notification indicates that the first packet has failed a service plane verification, and wherein the data collection feature includes a packet tracing feature applied to the one or more subsequent packets, the data collection feature augmenting the one or more subsequent packets with data that includes source and destination information corresponding to source and destination information of the first packet.

3. The method of claim 2, further comprising:
receiving a second notification indicating that the particular subsequent packet failed the service plane verification in the network, wherein the second notification includes packet trace information related to the particular subsequent packet traversing at least one of the one or more nodes in the network.

4. The method of claim 3, wherein the packet trace information includes a failure condition that caused the particular subsequent packet to fail the service plane verification.

5. The method of claim 4, wherein determining the cause for the failure of the transmission of the first packet in the network is based on the failure condition included in the packet trace information associated with the particular subsequent packet.

6. The method of claim 1, wherein the first notification is received from a particular node of the one or more nodes in the network or from a source external to the network.

7. The method of claim 6, wherein the particular node comprises a service node performing in-band operation, administration, and maintenance (OAM) functions.

8. The method of claim 1, wherein triggering the data collection feature on the one or more nodes in the network for the one or more subsequent packets that traverse the one or more nodes comprises causing data to be augmented to a subset of the one or more subsequent packets, and
wherein the method further comprises evaluating the subset of the one or more subsequent packets.

9. The method of claim 1, wherein the header that carries the iOAM tag is one of an Internet Protocol version 6 header or a Virtual eXtensible Local Area Network (VxLAN) Generic Protocol Extension (GPE) header.

10. The method of claim 1, wherein the iOAM tag comprises one or more of delay related data, packet loss data, telemetry data, packet routing information, service function information, or bandwidth related data.

11. An apparatus comprising:
a processor; and
a memory configured to store instructions, wherein the processor is configured to:
receive a first notification indicating a failure of a transmission of a first packet in a network;
in response to receiving the first notification, trigger a data collection feature on one or more nodes in the network for one or more subsequent packets that traverse the one or more nodes, wherein the one or more subsequent packets are augmented to carry metadata about the one or more nodes or network paths traversed by the one or more subsequent packets, wherein triggering the data collection feature comprises triggering the data collection feature on the one or more subsequent packets that comprises probe data included in an in-band operation, administration, and maintenance (iOAM) tag carried in a header of the one or more subsequent packets;
evaluate a particular subsequent packet of the one or more subsequent packets, wherein the particular subsequent packet is transmitted in the network after the first notification is received; and
determine a cause for the failure of the transmission of the first packet in the network based on data augmented to the particular subsequent packet.

12. The apparatus of claim 11, wherein the first notification indicates that the first packet has failed a service plane verification, and wherein the data collection feature includes a packet tracing feature applied to the one or more subsequent packets, the data collection feature augmenting the one or more subsequent packets with data that includes source and destination information corresponding to source and destination information of the first packet.

13. The apparatus of claim 12, wherein the processor is further configured to:
receive a second notification indicating that the particular subsequent packet failed the service plane verification in the network, wherein the second notification includes packet trace information related to the particular subsequent packet traversing at least one of the one or more nodes in the network.

14. The apparatus of claim 13, wherein the packet trace information includes a failure condition that caused the particular subsequent packet to fail the service plane verification, and wherein the processor is configured to determine the cause for the failure of the transmission of the first packet in the network based on the failure condition included in the packet trace information associated with the particular subsequent packet.

15. The apparatus of claim 11, wherein triggering the data collection feature on the one or more nodes in the network for the one or more subsequent packets that traverse the one or more nodes comprises causing data to be augmented to a subset of the one or more subsequent packets, and
wherein the processor is further configured to evaluate the subset of the one or more subsequent packets.

16. The apparatus of claim 11, wherein the header that carries the iOAM tag is one of an Internet Protocol version 6 header or a Virtual eXtensible Local Area Network (VxLAN) Generic Protocol Extension (GPE) header.

17. The apparatus of claim 11, wherein the iOAM tag comprises one or more of delay related data, packet loss data, telemetry data, packet routing information, service function information, or bandwidth related data.

18. One or more non-transitory computer readable storage media encoded with instructions that, when executed by a processor, cause the processor to:
receive a first notification indicating a failure of a transmission of a first packet in a network;
in response to receiving the first notification, trigger a data collection feature on one or more nodes in the network for one or more subsequent packets that traverse the one or more nodes, wherein the one or more subsequent packets are augmented to carry metadata about the one or more nodes or network paths traversed by the one or more subsequent packets, wherein triggering the data collection feature comprises triggering the data collection feature on the one or more subsequent packets that comprises probe data included in an in-band operation, administration, and maintenance (iOAM) tag carried in a header of the one or more subsequent packets;
evaluate a particular subsequent packet of the one or more subsequent packets, wherein the particular subsequent packet is transmitted in the network after the first notification is received; and
determine a cause for the failure of the transmission of the first packet in the network based on data augmented to the particular subsequent packet.

19. The one or more non-transitory computer readable storage media of claim 18, wherein the first notification indicates that the first packet has failed a service plane verification, and wherein the data collection feature includes a packet tracing feature applied to the one or more subsequent packets, the data collection feature augmenting the one or more subsequent packets with data that includes source and destination information corresponding to source and destination information of the first packet.

20. The one or more non-transitory computer readable storage media of claim 18, wherein the header that carries the iOAM tag is one of an Internet Protocol version 6 header or a Virtual eXtensible Local Area Network (VxLAN) Generic Protocol Extension (GPE) header.

* * * * *